(12) United States Patent
Hoekstra et al.

(10) Patent No.: US 7,658,142 B2
(45) Date of Patent: Feb. 9, 2010

(54) KETTLE ASSEMBLY

(75) Inventors: Johannes Albertus Hoekstra, Rotterdam (NL); Gerardus Egbertus Van Der Krogt, Unilever Bestfoods (NL)

(73) Assignee: Conopco, Inc., Englewood Cliffs, NJ (US)

( * ) Notice: Subject to any disclaimer, the term of this patent is extended or adjusted under 35 U.S.C. 154(b) by 538 days.

(21) Appl. No.: 10/559,587

(22) PCT Filed: May 19, 2004

(86) PCT No.: PCT/EP2004/005497

§ 371 (c)(1), (2), (4) Date: Dec. 2, 2005

(87) PCT Pub. No.: WO2004/105565

PCT Pub. Date: Dec. 9, 2004

(65) Prior Publication Data

US 2006/0117962 A1 Jun. 8, 2006

(30) Foreign Application Priority Data

Jun. 2, 2003 (EP) .................................. 030766992

(51) Int. Cl.
*A47J 37/00* (2006.01)
(52) U.S. Cl. .................. 99/331; 99/403; 99/448
(58) Field of Classification Search ........... 99/327–333, 99/403–418, 483, 33, 340, 372–385, 444–450, 99/367, 467; 219/429–433, 441, 442, 386; 220/912
See application file for complete search history.

(56) References Cited

U.S. PATENT DOCUMENTS

| 6,164,193 | A | * | 12/2000 | Perttola | 99/323.9 |
| 6,188,046 | B1 | | 2/2001 | Barrow | |
| 6,593,552 | B1 | * | 7/2003 | Li | 219/432 |
| 6,653,602 | B2 | * | 11/2003 | Li | 219/432 |
| 7,312,425 | B2 | * | 12/2007 | DeCobert et al. | 219/433 |

FOREIGN PATENT DOCUMENTS

| EP | 0 063 822 | 11/1982 |
| GB | 2 380 063 | 3/2003 |
| WO | 00/49924 | 8/2000 |

OTHER PUBLICATIONS

European Search Report No. EP 03 07 6699 dated Oct. 28, 2003—2 pp.
Int'l. Search Report No. PCT/EP2004/005497 dated Jul. 26, 2004—2 pp.
esp@cenet document printout Abstract of EP 0 063 822—1 page.
JP 2002/238 718—assigned to Fukui Craft KK—Derwent Abstract only.

* cited by examiner

*Primary Examiner*—Timothy F. Simone

(57) ABSTRACT

A kettle assembly for soup comprising a kettle part and a lid, characterised in that the kettle part comprises a cylindrical outer container (1) and a cylindrical inner container (2) fitting inside said outer container, said inner container having therein a vertical separating plate (3), such that at least two compartments are formed and that the lid (4) comprises a hinge (5), such that each of the compartment of the inner container can be opened separately.

9 Claims, 2 Drawing Sheets

KETTLE ASSEMBLY

TECHNICAL FIELD

The present invention relates to a kettle assembly. More specifically, it relates to a kettle assembly for soup having an outer container, and inner container and a lid.

BACKGROUND ART

Soup is a food product that is greatly appreciated as a light snack or as a starter in a more extensive dinner. It is important that the soup has to be served warm. At home, soup is usually prepared in a kettle in the kitchen. When the soup has been heated to the right temperature, it is poured into bowls using a ladle and served directly, such that it may be consumed while still warm. However, soup is also served in snack bars, waiting rooms, office restaurants, petrol stations, etc. In those circumstances, the soup is usually kept warm using an insulating kettle. For example, JP2002238718 (Fukui Craft KK) discloses such a heat-insulating container for soup, wherein an inner wall and an outer wall of the container are joined by a foaming resin. The soup is generally heated on an electric plate. A special situation exists in office restaurants with self-service, where the soup has to be kept warm unattended for longer periods. This is usually achieved by means of an electronic temperature control unit. For instance, GB-A-2 380 063 discloses an electric kettle and a means for s sensing the water temperature and switching-off the kettle at a pre-selected temperature.

If, however, the manager of the office restaurant wishes to offer the choice between more that one type of soup to his clients, this is often not possible because the available space is too restricted. It is therefor an object of the present invention to provide a kettle assembly that enables the simultaneous delivery of more than one type of soup at a constant, elevated temperature and in a restricted space.

Surprisingly, it was found that this object can be achieved by the kettle assembly for soup according to the present invention, comprising a kettle part and a lid, which is characterised in that the kettle part comprises a cylindrical outer container and a cylindrical inner container fitting inside said outer container, said inner container having therein a vertical separating plate, such that at least two compartments are formed and that the lid comprises a hinge, such that each of the compartments of the inner container can be opened separately.

SUMMARY OF THE INVENTION

Brief Summary Of The Invention

According to a first aspect of the present invention there is provided a kettle assembly for soup comprising a kettle part and a separate lid, characterised in that the kettle part comprises a cylindrical outer container and a cylindrical inner container fitting inside said outer container, said inner container having therein a vertical separating plate, such that at least two compartments are formed and that the lid has two parts connected by a hinge, such that each of the compartments of the inner container can be opened separately.

In a second aspect, there is provided process for the simultaneous dispensing of more than one type of soup, using the kettle assembly of the invention.

DETAILED DESCRIPTION OF THE INVENTION

The kettle assembly of the present invention comprises a kettle part and a lid part. The kettle part comprises a cylindrical outer container and a cylindrical inner container fitting inside said outer container. The outer container preferably comprises two handles to facilitate lifting and moving of the kettle assembly. Inside the outer container, there is an inner container that can be easily removed from the outer container. Between the inner container and the outer container there is a gap, which serves as an insulating layer to keep the temperature of the soup constant. Preferably, the gap is filled with water, which is kept on a predetermined temperature by means of an electrical heating means in the bottom of the outer container. The electric heating means usefully comprise some form of control mechanism to keep the temperature at a pre-set value. It therefore employs a sensor means for determining the temperature of the water, usually indirectly, that is without direct contact between the sensor and the water. Such means may comprise a bi-metallic element the operative part of which is in communication with the interior of the outer container, usually through a vent in the container wall.

According to a second aspect of this invention, there is provided a process the simultaneous dispensing of more than one type of soup. It will be clear, given the differences in taste of the clients, that the chance of selling a portion of soup will readily increase if more than one type of soup can be offered to the clients. Furthermore, all clients in general will benefit from a wider choice of soups.

Figure 1:
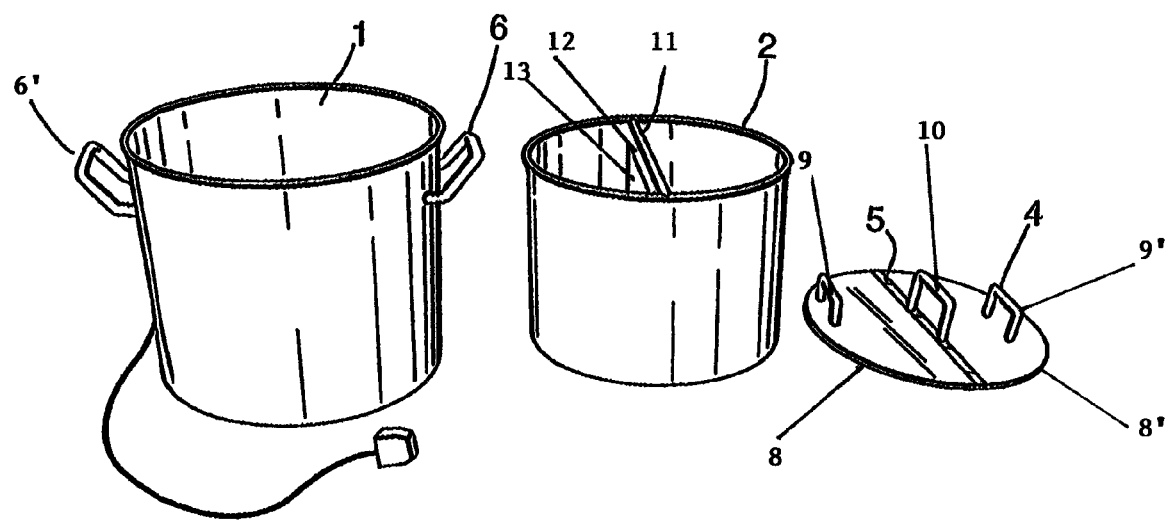
FIG. 1 shows in front view a kettle assembly according to the invention.
Figure 2:
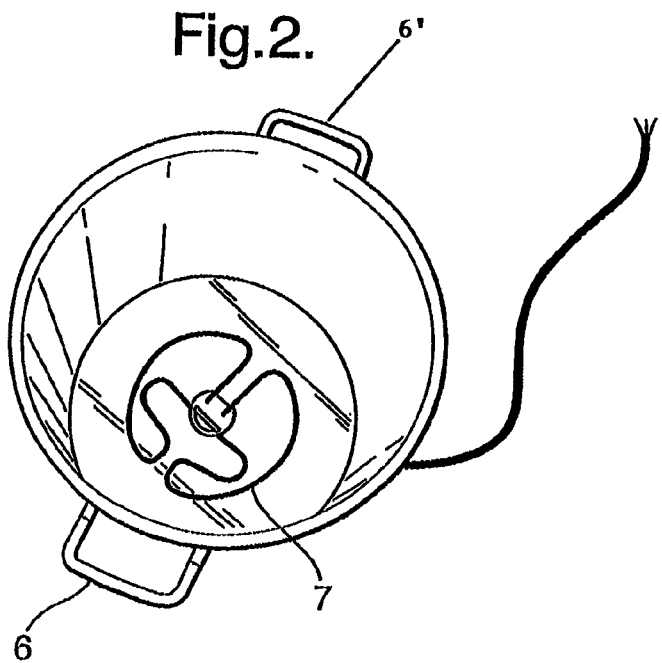
FIG. 2 shows the outer container and lid of the kettle assembly of FIG. 1 in more detail.
Figure 3:
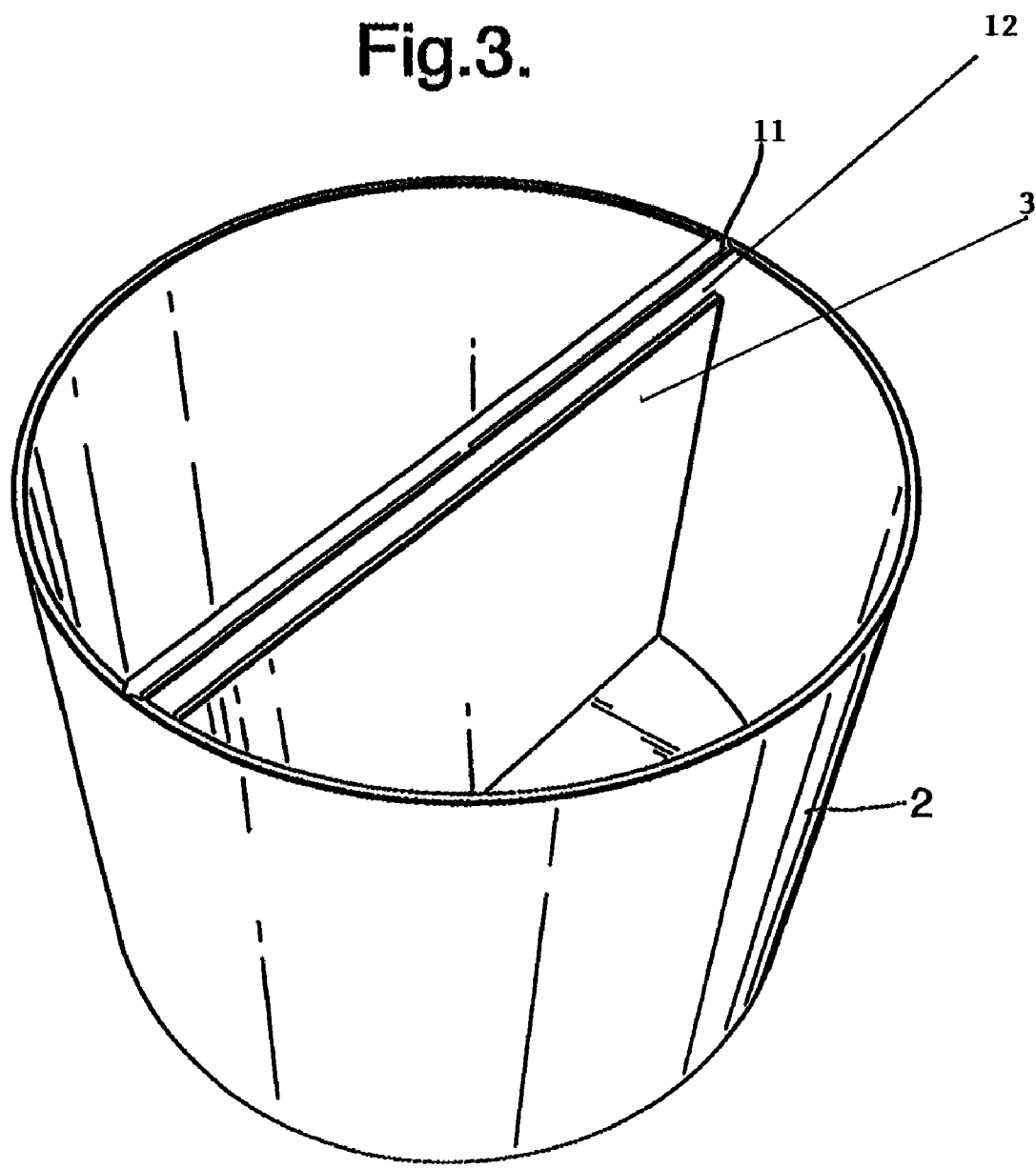
FIG. 3 shows the inner container of the kettle assembly of FIG. 1 in more detail.

This invention will now be described in more detail with reference to the drawings showing embodiments according to the various aspects of this so invention. In all the drawings like reference numerals designate like functional parts. Referring to FIGS. 1 to 3, the kettle assembly for soup comprises a cylindrical outer container (1) and a cylindrical inner container (2) which fits inside said outer container. The inner container has fitted therein a vertical separating plate (3), such that at least two compartments are formed. Furthermore, the separate lid (4) comprises two parts (8 and 8') connected by a hinge (5), such that each of the compartments of the inner container (2) can be opened separately.

In all the drawings like reference numerals designate like functional parts. Referring to FIGS. 1 to 3, the kettle assembly for soup comprises a cylindrical outer container (1) and a cylindrical inner container (2) which fits inside said outer container. The inner container has fitted therein a vertical separating plate (3), such that at least two compartments are formed. Furthermore, the lid (4) comprises a hinge (5), such that each of the compartments of the inner container (2) can be opened separately.

The separate lid (4) shown in FIG. 1 also includes three handles (9, 9' and 10). Handles (9) and (9') are located on lid parts (8) and (8') respectively and a third handle (10) is located over the hinge (5).

Preferably, the outer container (1) possesses two handles (6) and (6') to facilitate lifting and moving of the kettle assembly for filling and/or cleaning.

With reference to FIG. 3, the cylindrical inner container (1) further includes a central member (11) positioned above the vertical separating plate (3), said central member separated from the vertical separating plate by a gap (12).

The invention claimed is:

1. A kettle assembly for soup comprising a kettle part and a separate lid, said kettle part comprising a cylindrical outer container and a cylindrical inner container which fits inside said cylindrical outer container, said cylindrical inner container having a vertical separating plate such that two compartments are formed and wherein the separate lid has two parts connected by a hinge such that each of the compartments of the cylindrical inner container can be opened separately.

2. A kettle assembly according to claim 1, wherein the cylindrical outer container comprises two handles.

3. A kettle assembly according to claim 1, comprising electrical heating means in the bottom of the cylindrical outer container.

4. A kettle assembly according to claim 3, wherein the electrical heating means also comprise temperature control means.

5. A kettle assembly according to claim 3, wherein the temperature control means comprise a bi-metallic mechanism.

6. Process for the simultaneous dispensing of more than one type of soup by using the kettle assembly for soup according to claim 1.

7. A kettle assembly according to claim 1, wherein there is a gap between the cylindrical inner container and the cylindrical outer container said gap filled with water which is kept at a predetermined temperature by means of an electrical heating means in the bottom of the cylindrical outer layer.

8. A kettle assembly according to claim 1 wherein the separate lid includes three handles, wherein one handle is located on each of the two lid parts and one handle is located over the hinge.

9. A kettle assembly according to claim 1 wherein the cylindrical inner container further comprises a central member positioned above the vertical separating plate, said central member separated from the vertical separating plate by a gap.

\* \* \* \* \*